United States Patent
Yang et al.

(10) Patent No.: US 7,259,533 B2
(45) Date of Patent: Aug. 21, 2007

(54) METHOD OF CONTROLLING MOTOR DRIVE SPEED

(75) Inventors: Soon-bae Yang, Seoul (KR);
Tae-kyung Kim, Seoul (KR);
Sung-min Park, Hwaseong-si (KR);
Tae-won Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/266,353

(22) Filed: Nov. 4, 2005

(65) Prior Publication Data
US 2006/0119302 A1 Jun. 8, 2006

(30) Foreign Application Priority Data
Dec. 8, 2004 (KR) .................. 10-2004-0103177

(51) Int. Cl.
F04B 49/06 (2006.01)
F04B 49/12 (2006.01)
H02P 7/00 (2006.01)
(52) U.S. Cl. .................. 318/434; 318/606; 318/607; 318/433; 417/44.11; 417/53; 417/416; 417/417
(58) Field of Classification Search .................. None
See application file for complete search history.

(56) References Cited

U.S. PATENT DOCUMENTS

| | | | |
|---|---|---|---|
| 4,912,936 A * | 4/1990 | Denpou | 62/158 |
| 6,565,327 B2 * | 5/2003 | Yoo et al. | 417/44.1 |
| 6,746,211 B2 * | 6/2004 | Kwon et al. | 417/44.11 |
| 7,091,685 B2 * | 8/2006 | Makaran | 318/434 |
| 2003/0175125 A1 * | 9/2003 | Kwon et al. | 417/44.11 |
| 2004/0218320 A1 * | 11/2004 | Strike | 361/23 |
| 2005/0007096 A1 * | 1/2005 | Dimino et al. | 324/142 |
| 2005/0162114 A1 * | 7/2005 | Makaran | 318/434 |

OTHER PUBLICATIONS

U.S. Appl. No. 11/068,910 to Han et al., filed Mar. 2, 2005.
U.S. Appl. No. 11/074,791 to Han et al., filed Mar. 9, 2005.
U.S. Appl. No. 11/266,385 to Yang et al., filed Nov. 4, 2005.

* cited by examiner

*Primary Examiner*—Lincoln Donovan
*Assistant Examiner*—Eduardo Colon Santana
(74) *Attorney, Agent, or Firm*—Greenblum & Bernstein, P.L.C.

(57) ABSTRACT

Disclosed is a method of controlling drive speed of a motor operating in overload conditions. The method includes the steps of: driving the motor at a predetermined reference speed; detecting phase voltage and phase current applied to the motor; determining whether or not the motor is operating in overload conditions based on the detected phase voltage and phase current; and controlling the motor according to whether or not the motor is operating in overload conditions. Accordingly, the present invention can prevent occurrence of over-current due to the instantaneous acceleration of the motor to a predetermined initial speed.

9 Claims, 3 Drawing Sheets

METHOD OF CONTROLLING MOTOR DRIVE SPEED

BACKGROUND OF THE INVENTION

This application claims the priority of Korean Patent Application No. 2004-103177, filed on Dec. 8, 2004, in the Korean Intellectual Property Office, the disclosure of which is incorporated herein in its entirety by reference.

1. Field of the Invention

The present relates to a motor control method and, more particularly, to a method of controlling drive speed of a motor operating in an overload condition.

2. Description of Related Art

In general, an air conditioner, which is an example of an air handling unit, is equipped with a compressor motor. The motor is controlled based on a motor drive algorithm so that drive speed of the motor decreases under overload conditions and returns to a normal speed after the overload conditions disappear.

A system employing such an algorithm, such as an air-conditioning system, includes a current transformer (hereinafter referred to as "CT") incorporated in a power source. The system detects a current flowing in the power source through the CT while a compressor is operating, and controls drive speed of a compressor motor based on the detected current.

A detailed description thereof will now be given with reference to FIG. 1. First, while driving the compressor motor with a predetermined initial speed W (step S1), a motor drive-speed controller decelerates the drive speed by one level (step S5) if a current detected by the CT is greater than a first set current (step S3). The motor drive-speed controller continues to drive the motor with the initial speed W if the current is not greater than the first set current.

After one-level deceleration, the motor drive-speed controller continuously monitors the detected current. The motor drive-speed controller decelerates the drive speed by a further one level (step S7) if the detected current is still greater than the first set current for over a time period of T1 (step S6). Otherwise, the motor drive-speed controller drives the motor with the one-level decelerated speed (step S9).

After a further one-level deceleration, the motor drive-speed controller sets the drive speed back to the initial speed W if the detected current is less than the first set current for over a time period of T2 (step S8). Otherwise, the motor drive-speed controller drives the motor with the decelerated speed.

If the detected current is greater than a second set current (step S4), the motor drive-speed controller brings the motor to a halt (step S10) and then increases the number of times (n) the motor has been halted (step S11). If the number of times (n) reaches a predetermined threshold value within a time period of T4 (step S12), an apparatus equipped with the motor should be completely halted and then an error sign appears on a display (step S13). Otherwise, it is determined whether or not a time period of T3 has elapsed (step S15) while the motor is still halted (step S14). The motor is driven again with the initial speed W if the time period of T3 is determined to have elapsed (step S1). Otherwise, the motor remains in a halt state (step S14).

According to the above-mentioned typical method of controlling a compressor motor, the motor is controlled by accelerating/decelerating drive speed of the motor based on a current detected by the CT.

Accordingly, there is a problem in that it is not possible to operate an air-conditioner compressor if the CT is broken.

Further, if the motor for the air-conditioner compressor is instantaneously accelerated back to the initial speed after it has been decelerated through the above-mentioned two steps S5 and S7 or it has been halted, other adjacent elements composing the air conditioner may be broken down due to over-current which may be instantaneously generated, thereby causing the air conditioner to stop operating.

SUMMARY OF THE INVENTION

The present invention provides a method of controlling a compressor motor, which is capable of accelerating drive speed of the motor which has been decelerated due to overload up to an initial reference speed in a stepwise manner so that occurrence of over-current due to the instantaneous acceleration of the motor can be prevented.

According to an aspect of the present invention, there is provided a method of controlling a compressor motor, the method comprising the steps of: a) driving the motor at a predetermined reference speed; b) detecting phase voltage and phase current applied to the motor; c) determining whether or not the motor is operating in overload conditions based on the detected phase voltage and phase current; and d) controlling the motor according to whether or not the motor is operating in overload conditions.

According to another aspect of the present invention, there is provided a method of controlling a compressor motor, the method comprising the steps of: a) rectifying alternating current (AC) voltage into direct current (DC) voltage by use of a rectifier; b) converting the DC voltage inputted from the rectifier into three-phase AC voltage by use of an inverter; c) driving the motor with the three-phase AC voltage inputted from the inverter; d) detecting the AC voltage outputted from the inverter and DC link current and outputting the detected AC voltage and DC link current by use of a current/voltage detector; e) outputting a drive speed control signal controlling drive speed of the motor according to the detected AC voltage and DC link current inputted from the current/voltage detector by use of a drive speed controller; and f) controlling the motor by controlling the three-phase AC voltage according to the drive speed control signal inputted from the drive speed controller by use of the inverter.

According to the present invention, it is possible to accelerate the drive speed of the motor which has been decelerated due to overload up to an initial reference speed (also called instruction speed) in a stepwise manner so that occurrence of over-current due to the instantaneous acceleration of the motor can be prevented.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings. In the following description, a detailed description of well-known functions and configurations incorporated herein will be omitted when it may make the subject matter of the present invention rather unclear. Although the following embodiments of the present invention will be described with reference to a BLDC motor for driving a compressor, the present invention can provide control of a washing-machine motor as well as control of a synchronous reluctance motor.

Figure 1:
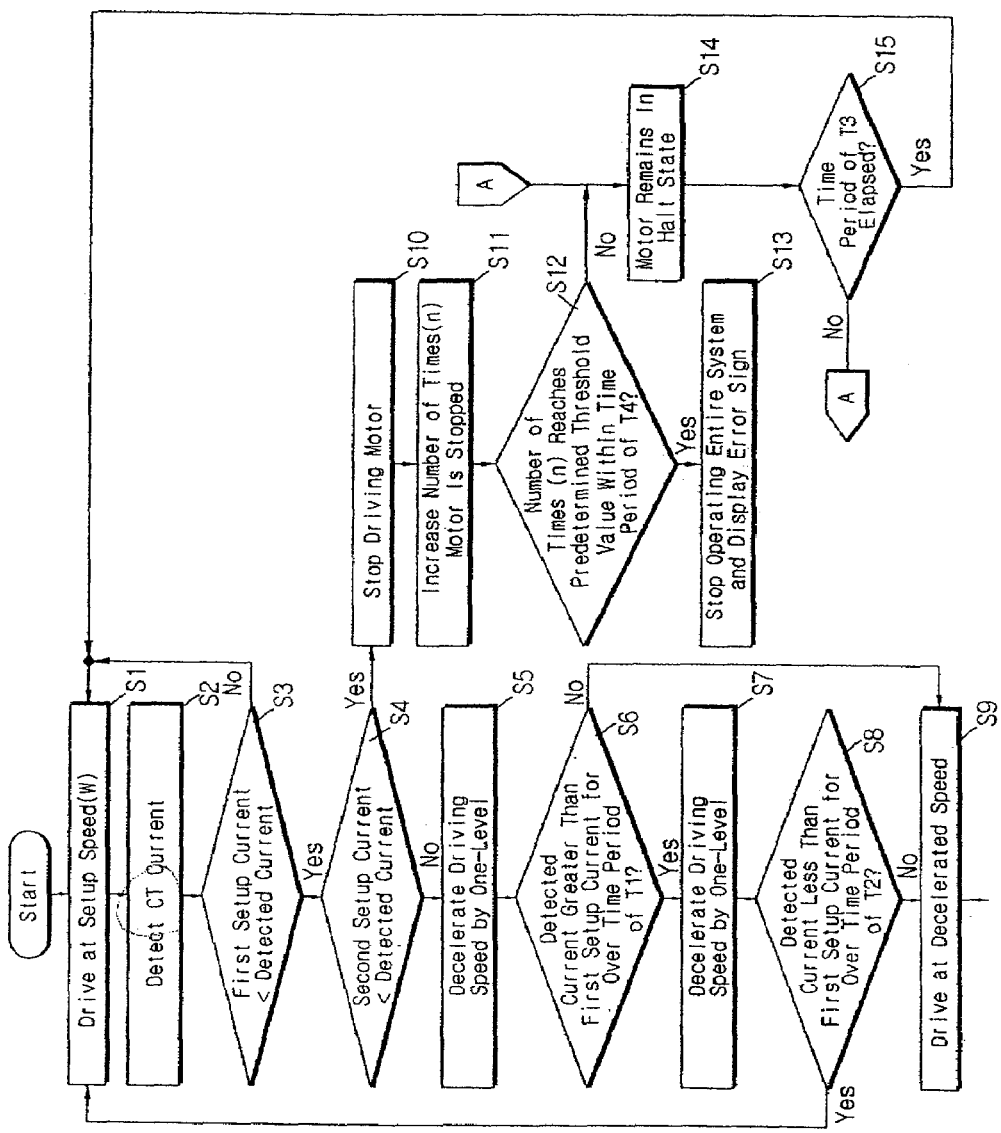
FIG. 1 is a flow chart showing a method of controlling a motor for driving a typical air-conditioner compressor.
Figure 2:
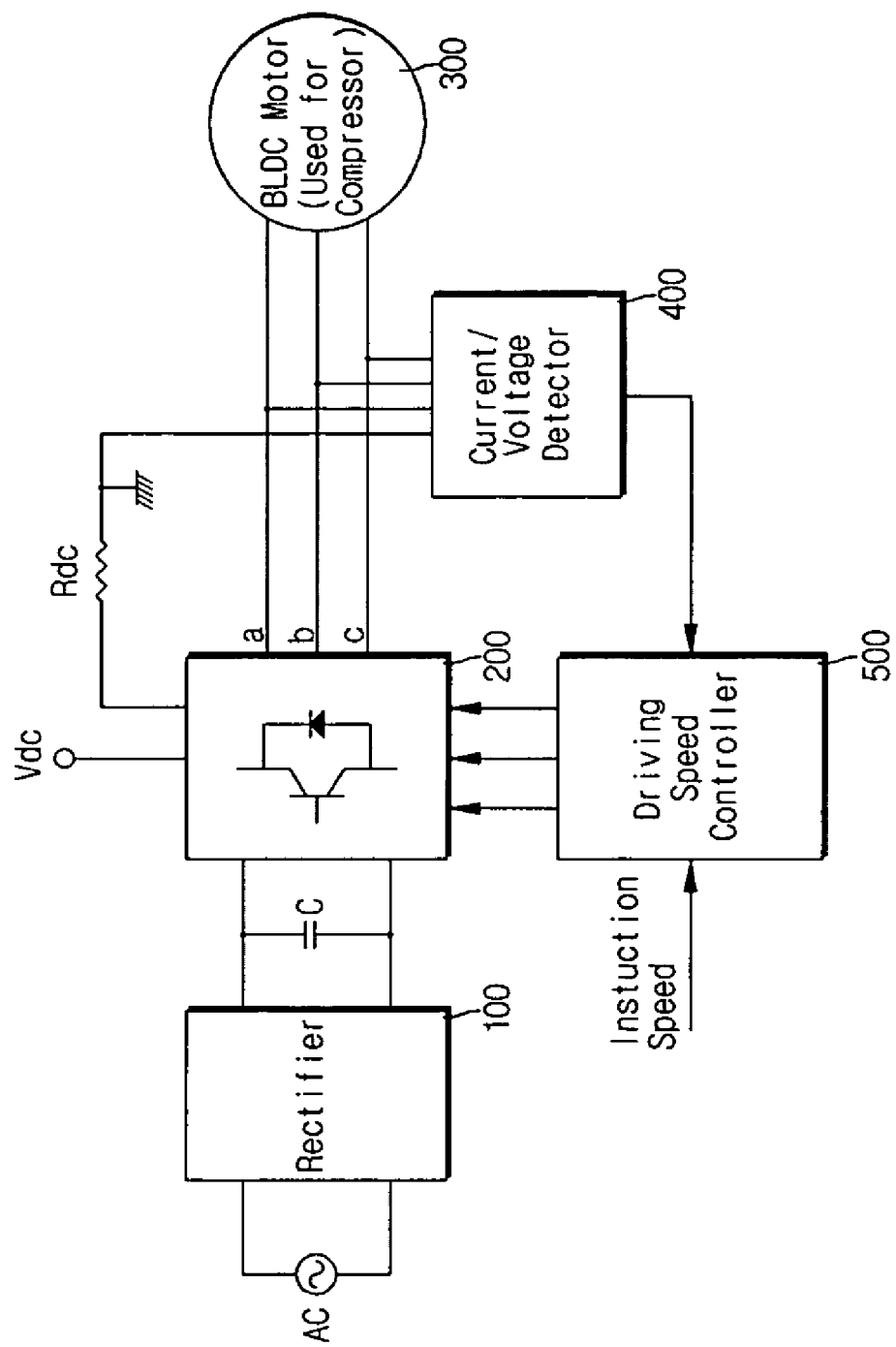
FIG. 2 is a block diagram showing a construction of a sensorless BLDC (brushless direct current) motor controller for driving a compressor in accordance with an embodiment of the present invention.

FIG. 2 is a block diagram showing a construction of a sensorless BLDC motor controller for driving a compressor in accordance with an embodiment of the present invention.

Referring to FIG. 2, a rectifier 100, which is a type of a power converter, rectifies alternating current (AC) voltage to direct current (DC) voltage, which is charged into the following capacitor C. Next, the DC voltage is converted into three-phase AC voltage in an inverter 200 comprised of 6 power modules (also called switching modules), and the three-phase AC voltage is then applied to a BLDC motor 300. The BLDC motor 300 is driven by the three-phase AC voltage generated in the inverter 200. The three-phase AC voltage is adjusted according to a motor drive-speed control signal outputted from a drive-speed controller 500.

A current/voltage detector 400 detects each phase (a, b or c) voltage in an output terminal of the inverter 200 and also detects a DC link current flowing through a DC link resistance $R_{dc}$. The current/voltage detector 400 outputs current and voltage detection signals corresponding to the detected voltage and current. This is called a sensorless scheme in which information on phase current of the motor can be obtained by detecting the DC link current without an extra sensor. The sensorless scheme is well known in the art and a detailed description thereof will thus be omitted herein.

The drive speed controller 500 acts to control drive speed of the BLDC motor 300 for driving a compressor according to the control method in accordance with the present invention. The drive speed controller 500 comprises a calculator which estimates the location and speed of a rotor from the current/voltage detection signals outputted from the current/voltage detector 400, a comparator which compares the estimated speed obtained by the calculator with a reference speed (also called an initial instruction speed), a speed controller which outputs a speed control signal for controlling the motor drive speed based on the comparison result obtained from the comparator, and a voltage instruction unit which generates a voltage instruction signal through the speed control signal and the estimated rotor location.

A process of controlling the BLDC motor 300 by use of the drive speed controller 500 will now be described with reference to FIG. 3.

Figure 3:
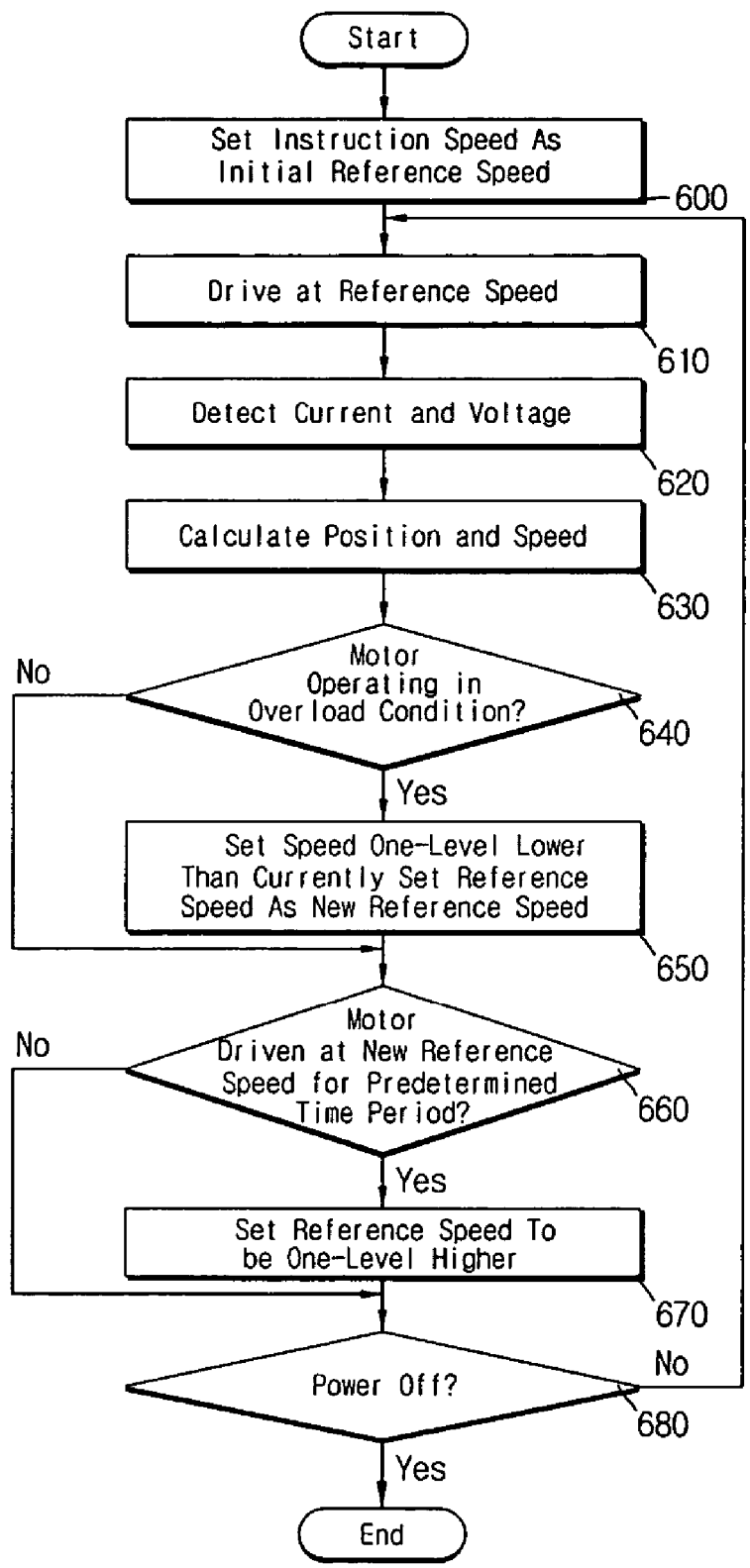
FIG. 3 is a flow chart showing a method of controlling drive speed of a motor operating in an overload condition in accordance with an embodiment of the present invention.

FIG. 3 is a flow chart showing a method of controlling drive speed of a motor operating in an overload condition in accordance with an embodiment of the present invention.

The method comprising the steps of: driving the motor at a predetermined reference speed; detecting phase voltage and phase current applied to the motor; determining whether or not the motor is operating in overload conditions based on the detected phase voltage and phase current; and controlling the motor according to whether or not the motor is operating in overload conditions.

In more detail, the drive speed controller 500 sets an inputted instruction speed as an initial reference speed (step 600), and then drives a motor with the set reference speed (step 610). A voltage instruction signal for driving the motor with the reference speed is generated in the drive speed controller 500 and applied to switching modules in the inverter 200. The inverter 200 converts DC link voltage $V_{dc}$ into three-phase AC voltage according to the voltage instruction signal. Subsequently, the BLDC motor 300 is driven by the three-phase AC voltage generated in the inverter 200.

Once the motor is driven, the current/voltage detector 400 detects each phase voltage and each phase current of the motor from an output terminal of the inverter 200 (step 620). Current/voltage detection signals obtained based on the detected phase voltage and phase current are applied to the drive speed controller 500.

Accordingly, the drive speed controller 500 receives the current/voltage detection signals and estimates the location and speed of the motor rotor based on the following Equation 1 (step 630). In Equation 1, R denotes resistance, $\theta_e$ denotes location of rotor, $\omega_e$ denotes speed of rotor, $L_s$ denotes inductance of stator, $V_a$, $V_b$, and $V_c$ denote phase voltages, $i_a$, $i_b$, and $i_c$ denote phase currents, and $K_E$ denotes counter-electromotive force constant.

$$K_E \omega_e \sin\theta_e = V_a - Ri_a - \frac{di_a}{dt}(L_s i_a) \qquad \text{[Equation 1]}$$

$$K_E \omega_e \sin(\theta_e + 120) = V_b - Ri_b - \frac{di_b}{dt}(L_s i_b)$$

$$K_E \omega_e \sin(\theta_e + 240) = V_c - Ri_c - \frac{di_c}{dt}(L_s i_c)$$

The location and speed of the rotor estimated by Equation 1 used to continue to drive the motor with the set reference speed.

On the other hand, when an overload condition occurs in an operating BLDC motor 300 due to an increase of pressure in the compressor (step 640), the drive speed controller 500 sets a speed one-level lower than a currently set reference speed as a new reference speed (step 650).

For reference, it is determined to be an overload condition if the speed estimated by Equation 1 is W2 or more lower than a currently set reference speed. At this time, W2 corresponds to a threshold value which exceeds an error compensation range between the reference speed and the estimated speed, and may have different values according to the drive speed of the motor. Further, it can be determined to be an overload condition if the current detected by the current/voltage detector 400 exceeds a speed-limiting current.

As described above, after changing the reference speed to a newly set reference speed due to the overload conditions, the drive speed controller 500 determines whether or not the motor has been driven with the newly set reference speed for a predetermined time period (step 660). The predetermined time period can be set by making reference to the pressure release time of a compressor. If the motor has not been driven with the newly set reference speed for a predetermined time period, steps 610 to 660 are repeated. That is, driving conditions of the motor are continuously monitored until the overload conditions are removed at the newly set reference speed. If the motor is determined to operate in overload conditions, the drive speed of the motor is decelerated in a stepwise manner.

If the motor has been driven with the newly set reference speed for a predetermined time period, it implies that an overload condition has been removed at the newly set reference speed. Thus, the drive speed controller 500 sets the reference speed to be one-level higher (step 670). After it is determined whether or not power is turned off, the drive speed controller 500 drives the motor 300 with the reference speed set in step 670 and then steps 620 to 680 are repeated. Each time the motor is driven with a newly set reference speed for a predetermined time period without any interruption, the drive speed of the motor which has been decelerated due to overload will be accelerated in a stepwise manner by performing step 670 repeatedly.

Accordingly, the drive speed controller 500 can increase the drive speed which has been decelerated due to overload up to the initial reference speed by performing step 670 repeatedly. At this time, since the decelerated drive speed is increased up to the initial reference speed in a stepwise manner, it is possible to prevent occurrence of over-current caused by instantaneous acceleration.

For reference, it is preferred that the stepwise amounts of acceleration and of deceleration of the motor drive speed are differently set according to the motor drive speed. This is necessary to minimize a decrease in system performance and to minimize the time required to return to a normal state. Further, the stepwise amounts of acceleration and of deceleration of the motor drive speed are different from each other and may be differently set according to the motor drive speed. This is also necessary to minimize a decrease in system performance and to minimize the time required to return to a normal state.

As apparent from the above description, the present invention can accelerate the drive speed of the motor which has been decelerated due to overload up to an initial reference speed in a stepwise manner so that occurrence of over-current due to the instantaneous acceleration of the motor can be prevented.

Further, the present invention is advantageous in the aspect of manufacturing cost since an additional current detector used for detecting a current flowing through a power source is not necessary.

Although the above-mentioned embodiments of the present invention are described with reference to the BLDC motor for driving the compressor, the present invention can provide control of a washing-machine motor as well as control of a synchronous reluctance motor.

While the present invention has been described with reference to exemplary embodiments thereof, it will be understood by those skilled in the art that various changes in form and details may be made therein without departing from the scope of the present invention as defined by the following claims.

What is claimed is:

1. A method of controlling a compressor motor, the method comprising:
   driving the motor at a predetermined reference speed;
   detecting a phase voltage and a phase current applied to the motor;
   determining whether the motor is operating in overload conditions based on the detected phase voltage and phase current; and
   controlling the motor according to whether the motor is operating in overload conditions, the controlling including accelerating the motor in a stepwise manner including more than one step, when the motor is determined not to operate in overload conditions, and decelerating the motor when the motor is determined to operate in overload conditions.

2. The method of claim 1, wherein determining includes:
   estimating a speed of the motor based on the detected phase voltage and phase current; and
   determining whether the motor is operating in overload conditions by comparing the estimated speed of the motor with the predetermined reference speed of the motor.

3. The method of claim 2, wherein the motor is determined to operate in overload conditions when the estimated speed is lower than the predetermined reference speed.

4. The method of claim 1, wherein determining monitors a time the motor is driven at a decelerated speed and determines that the overload conditions of the motor are removed when the motor is driven at the decelerated speed for over a predetermined time period.

5. The method of claim 4, wherein controlling includes accelerating the motor when it is determined that the overload conditions of the motor are removed.

6. A method of controlling a compressor motor, the method comprising:
   driving the motor at a predetermined reference speed;
   detecting a phase voltage and a phase current applied to motor;
   determining whether the motor is operating in overload conditions based on the detected phase voltage and phase current; and
   controlling the motor according to whether the motor is operating in overload conditions,
   wherein the determining includes:
   estimating a speed of the motor based on the detected phase voltage and phase current; and
   determining whether the motor is operating in overload conditions by comparing the estimated speed of the motor with the predetermined reference speed of the motor,
   wherein controlling the motor includes decelerating the motor when the motor is determined to operate in overload conditions, and
   wherein decelerating the motor includes:
   calculating a deceleration amount of the motor speed decelerated from the estimated speed of the motor; and
   decelerating the motor in a stepwise manner according to the calculated deceleration amount.

7. The method of claim 6, wherein the deceleration amount of the motor speed is differently set according to the estimated speed of the motor.

8. A method of controlling a compressor motor, the method comprising:
   driving the motor at a predetermined reference speed;
   detecting a phase voltage and a phase current applied to motor;
   determining whether the motor is operating in overload conditions based on the detected phase voltage and phase current; and
   controlling the motor according to whether the motor is operating in overload conditions,
   wherein determining monitors a time the motor is driven at a decelerated speed and determines that the overload conditions of the motor are removed when the motor is driven at the decelerated speed for over a predetermined time period,
   wherein the controlling includes accelerating the motor when it is determined that the overload conditions of the motor are removed, and wherein accelerating the motor includes:

calculating an acceleration amount of the motor speed accelerated from the decelerated speed of the motor; and accelerated the motor in a stepwise manner according to the calculated acceleration amount.

9. The method of claim 8, wherein the acceleration amount of the motor speed is differently set according to the decelerated speed of the motor.

* * * * *

UNITED STATES PATENT AND TRADEMARK OFFICE
CERTIFICATE OF CORRECTION

PATENT NO. : 7,259,533 B2 Page 1 of 1
APPLICATION NO. : 11/266353
DATED : August 21, 2007
INVENTOR(S) : S. Yang et al.

It is certified that error appears in the above-identified patent and that said Letters Patent is hereby corrected as shown below:

At column 6, line 22 (claim 6, line 4) of the printed patent, after "to" insert --the--.

At column 7, line 4, (claim 8, line 23) of the printed patent, "accelerated" should be --acceleration--.

Signed and Sealed this

Twenty-fourth Day of June, 2008

JON W. DUDAS
*Director of the United States Patent and Trademark Office*